United States Patent
Kosonocky et al.

(10) Patent No.: US 9,772,676 B2
(45) Date of Patent: Sep. 26, 2017

(54) ADAPTIVE VOLTAGE SCALING BASED ON STAGE TRANSITIONS OR RING OSCILLATOR REVOLUTIONS

(71) Applicant: Advanced Micro Devices, Inc., Sunnyvale, CA (US)

(72) Inventors: Stephen Kosonocky, Fort Collins, CO (US); Samuel Naffziger, Fort Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 404 days.

(21) Appl. No.: 14/190,803

(22) Filed: Feb. 26, 2014

(65) Prior Publication Data

US 2015/0241955 A1    Aug. 27, 2015

(51) Int. Cl.
  *G06F 1/00*     (2006.01)
  *G06F 1/32*     (2006.01)
  *G06F 1/20*     (2006.01)

(52) U.S. Cl.
  CPC ............ *G06F 1/3296* (2013.01); *G06F 1/206* (2013.01); *G06F 1/3206* (2013.01); *Y02B 60/1275* (2013.01); *Y02B 60/1285* (2013.01)

(58) Field of Classification Search
  CPC ....................................................... G06F 1/32
  See application file for complete search history.

(56) References Cited

U.S. PATENT DOCUMENTS

| | | | | |
|---|---|---|---|---|
| 6,298,000 | B1 * | 10/2001 | Kitade | G11C 11/406 365/189.07 |
| 8,593,171 | B2 * | 11/2013 | Kosonocky | G01R 31/40 324/764.01 |
| 9,194,914 | B2 * | 11/2015 | Kosonocky | G01R 31/31854 |
| 2005/0225380 | A1 * | 10/2005 | Ingino | G05F 1/575 |
| 2008/0136400 | A1 * | 6/2008 | Chi | G06F 1/3203 323/318 |
| 2009/0289615 | A1 * | 11/2009 | Foley | G06F 1/3203 323/318 |
| 2012/0126847 | A1 * | 5/2012 | Kosonocky | G01R 31/40 324/764.01 |
| 2014/0333358 | A1 * | 11/2014 | Kim | H03L 7/1974 327/159 |
| 2015/0026531 | A1 * | 1/2015 | Kosonocky | G01R 31/31857 714/726 |

OTHER PUBLICATIONS

Charles Lefurgy et al, "Active Management of Timing Guardband to Save Energy in POWER7", IBM, Dec. 7, 2011.

* cited by examiner

*Primary Examiner* — Mohammed Rehman (57) ABSTRACT

Some embodiments of a processing device include one or more power supply monitors to provide one or more counts representative of one or more operating frequencies of one or more circuit blocks based on a voltage supplied to the circuit block(s). Some embodiments of the processing device also include a system management unit to determine an initial voltage supplied to the circuit block(s) based on a target count and to reduce the voltage supplied to the circuit block(s) from the initial voltage in response to the count(s) generated by the power supply monitor(s) exceeding the target count.

12 Claims, 10 Drawing Sheets

ADAPTIVE VOLTAGE SCALING BASED ON STAGE TRANSITIONS OR RING OSCILLATOR REVOLUTIONS

BACKGROUND

Field of the Disclosure

The present disclosure relates generally to processing devices and, more particularly, to adaptive voltage scaling in processing devices.

Description of the Related Art

Processing devices such as central processing units (CPUs), graphics processing units (GPUs), and accelerated processing units (APUs) are characterized by an operating frequency. For example, a CPU in a personal desktop computer may operate at a frequency that is at least equal to a characteristic operating frequency, e.g., of 3.0 GHz. The processing device may be characterized on a tester during manufacturing to determine its maximum operating frequency within a predetermined power envelope and power supply voltage. Margins may then be added to account for tester uncertainty, power supply uncertainty, workload induced thermal or voltage variation, aging, random uncertainty, and other possible variations. For example, the voltage of the power supplied (i.e., the operating voltage) to the processing device may be set to a value that is high enough to ensure that the processing device continues to operate at or above its characteristic operating frequency in a worst-case scenario. However, adding the high margin to the voltage may not be necessary in typical operating scenarios and may waste power.

Dynamic on-die speed measurements are described by Charles Lefurgy, et. al., "Active Management of Timing Guardband to Save Energy in POWER7", MICRO-44, Dec. 3-7, 2011. In this system, on-die critical path monitors are used to track the local variation of critical paths in a processing device during runtime. The speeds of the on-die critical path monitors are continuously monitored and compared against a target clock frequency. The operating frequency or the operating voltage supplied to the system can then be adjusted based on the comparison. However, the system requires at-speed signals to propagate through the processing device to a central performance controller that performs the comparison and implements the decision algorithm used to adjust the operating frequency or voltage. Furthermore, dynamic frequency adjustments cause frequency uncertainty, which can decrease overall performance because of increased latency and the potential for processor data to be unpredictably unavailable to external resources.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-9 illustrate some embodiments of adaptive voltage scaling in a processing device that includes one or more power supply monitors (PSMs) that generate an output signal (referred to hereinafter as a count) in response to an applied voltage. The count generated by each PSM is representative of the operating frequency of the PSM and an associated portion of the processing device. The processing device also includes a system management unit that sets an initial voltage for the processing device based on a target operating frequency and a model of the operating frequency of the processing device as a function of temperature and voltage (referred to herein as the temperature-voltage model). The voltage supplied to the processing device can then be reduced from the initial value when the counts generated by one or more PSMs are higher than a target count associated with the target operating frequency. Reducing the initial voltage by adaptive voltage scaling reduces the power consumed by the processing device without causing the operating frequency of the processing device to fall below its characteristic operating frequency. Furthermore, the operating frequency of the processing device is not dynamically adjusted and synchronization to external resources is therefore unaffected by the voltage adjustments.

Some embodiments of the system management unit may generate the temperature-voltage model by interpolating between measured values of the PSM counts at predetermined values of the temperature and voltage. For example, at low voltages, the operating frequency of the processing device (and therefore the counts generated by the PSMs) may be most sensitive to changes in the voltage thresholds of the constituent transistors of the processing device. The operating frequency of the processing device may therefore increase with increasing temperature at a fixed voltage. In contrast, at high voltages, the operating frequency of the processing device (and therefore the counts generated by the PSMs) may decrease with increasing temperature at a fixed voltage. This phenomena is referred to as a temperature inversion. The low-voltage regime and the high-voltage regime meet at the temperature inversion voltage of the processing device. The model of the operating frequency may therefore be generated by interpolating between the counts generated for a worst-case (low-temperature) operating frequency at a voltage below the temperature inversion voltage, an operating frequency approximately at the temperature inversion voltage, and a worst-case (high-temperature) operating frequency at a voltage above the temperature inversion voltage.

Figure 1:
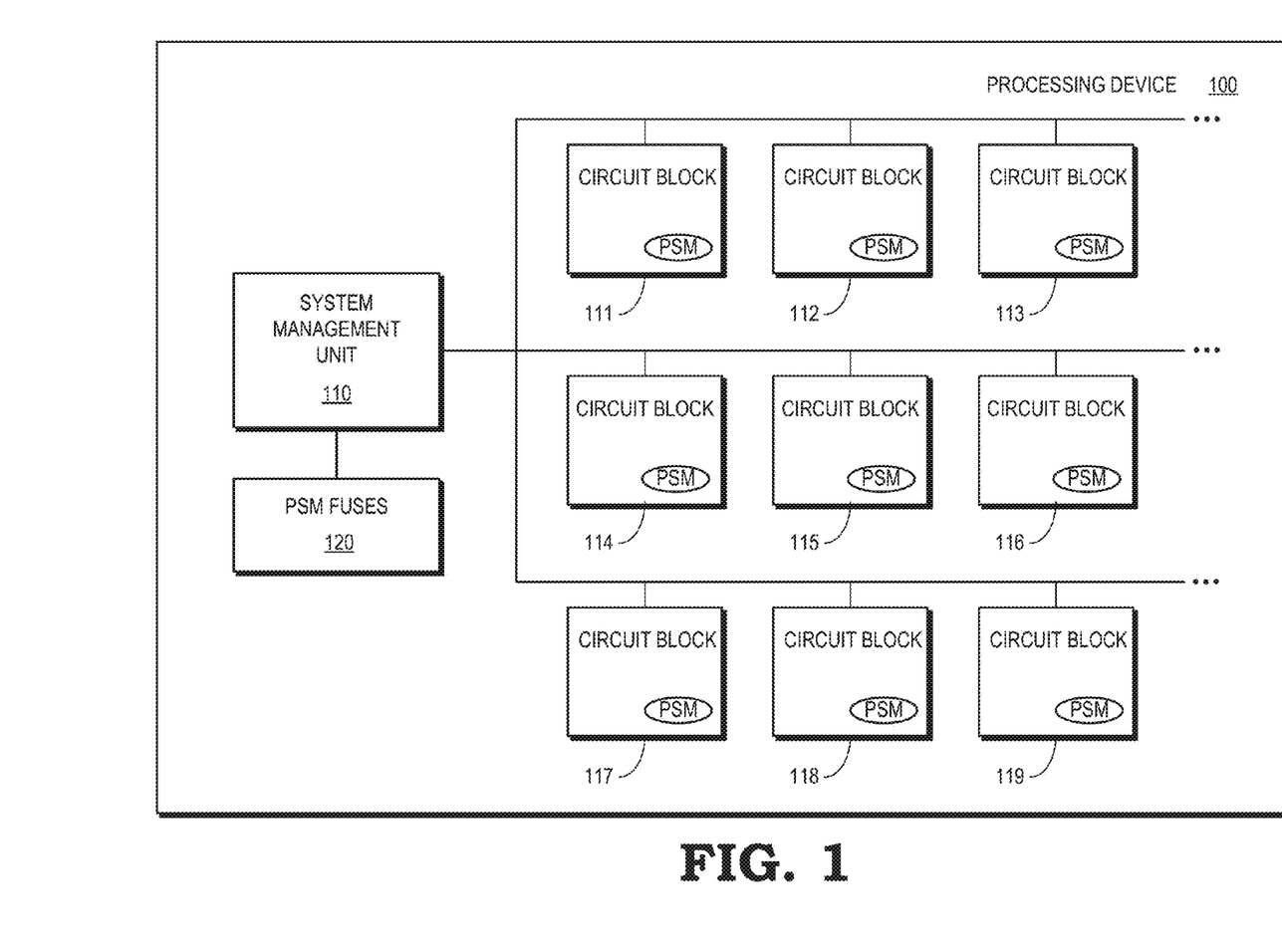
FIG. 1 is a block diagram of a processing device in accordance with some embodiments.

FIG. 1 is a block diagram of a processing device 100 in accordance with some embodiments. The processing device 100 may be a data processor, a very large scale integrated circuit (VLSI), a system on a chip (SoC), a central processing unit (CPU), an accelerated processing unit (APU), a graphics processing unit (GPU), a memory sub-system, a system controller, a peripheral function, or some other type of processing device. The processing device 100 shown in FIG. 1 includes a plurality of circuit blocks 111-119, which may be used to implement portions of the functionality of the processing device 100. The circuit blocks 111-119 may therefore be interconnected and communicate with each other, e.g., by transmitting or receiving signals over various lines, traces, buses, vias, through-silicon vias, and the like. In the interest of clarity, interconnections between the circuit blocks 111-119 are not shown in FIG. 1.

Each circuit block 111-119 is also associated with a PSM that generates an output signal representative of the voltage applied to the PSM and an operating frequency of the corresponding circuit block 111-119. Exemplary PSMs are described in U.S. Patent Application Publication No. 2012/0126847, entitled Power Supply Monitor, by Stephen V. Kosonocky and Gregory K. Chen, which is incorporated herein by reference in its entirety. The PSMs may be incorporated in the circuit blocks 111-119 as shown in FIG. 1 or they may be implemented as separate devices that are coupled to the circuit blocks 111-119. Persons of ordinary skill in the art having benefit of the present disclosure should appreciate that some embodiments of the processing device 100 may include circuit blocks 111-119 that are associated with more than one PSM. Moreover, some PSMs may be associated with more than one circuit block 111-119.

The processing device 100 includes a system management unit 110 for managing thermal and power conditions at the device. Some embodiments of the system management unit 110 may control the voltage supplied to the circuit blocks 111-119. For example, a power supply (not shown) may be configured to supply power to the circuit blocks 111-119 at a voltage that ranges from a minimum voltage (VMIN) to a maximum voltage (VMAX). The system management unit 110 may therefore be able to modify the voltage supplied to the circuit blocks 111-119 within this range, e.g., to modify the operating voltage of one or more of the circuit blocks 111-119. Some embodiments of the system management unit 110 may also communicate with the PSMs in the circuit blocks 111-119 over an interface (not shown in FIG. 1).

Each PSM receives a voltage input that corresponds to the voltage that is supplied to the corresponding circuit block 111-119. For example, the voltage received by the PSM in the circuit block 111 may be substantially equal to the voltage provided to the circuit block 111 by a power supply (not shown in FIG. 1). Each PSM may then generate an output signal (e.g., a count) that is indicative of an operating frequency of the PSM and the corresponding circuit block 111-119. Some embodiments of the PSMs may include a ring oscillator and a counter to count a number of stage transitions or ring oscillator revolutions during a measurement period. The PSMs may then output the number generated by the counter as an indicator of the operating frequency of the PSM and the corresponding circuit block 111-119.

Figure 2:
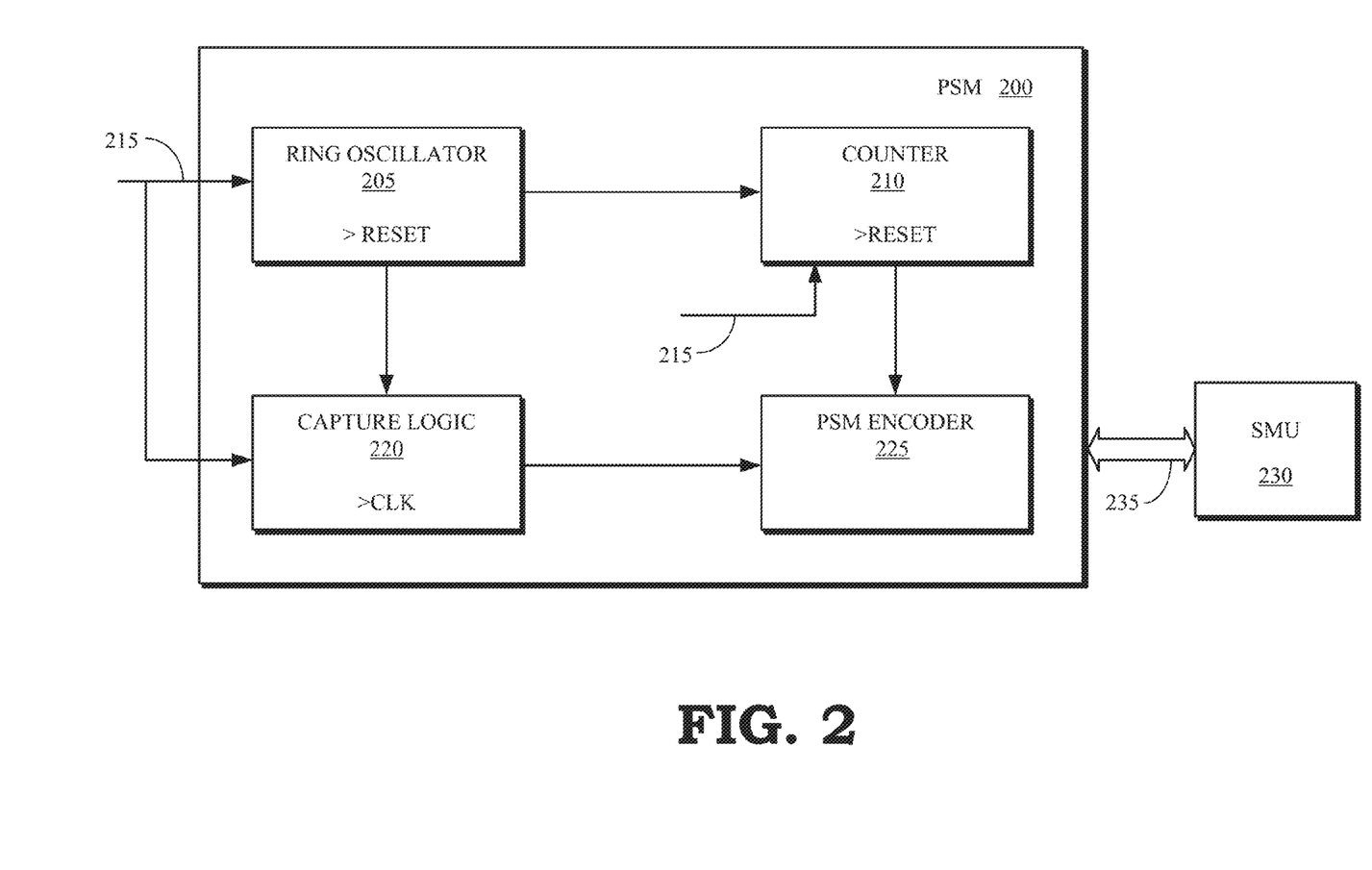
FIG. 2 is a block diagram of a power supply monitor (PSM) that may be used in the processing device shown in FIG. 1 in accordance with some embodiments.

FIG. 2 is a block diagram of a PSM 200 that may be used in the processing device 100 shown in FIG. 1 in accordance with some embodiments. Some embodiments of the PSM 200 include a ring oscillator 205 that may be formed of multiple stages and the number of stages used to form the ring oscillator 205 may determine, at least in part, the voltage or frequency resolution of the PSM 200. For example, each stage of the ring oscillator 205 may include a delay element (not shown) such as an inverter and the delay elements can be connected in a ring configuration.

A counter 210 in the PSM 200 can count the number of stage transitions in the ring oscillator 205 during a selected measurement period such as a clock cycle, a combination of multiple clock cycles, or a fraction of a clock cycle. Variations in the temperature of the PSM 200 and/or the supplied voltage can increase or decrease the oscillator speed of the ring oscillator 205, resulting in more or fewer stage transitions in the multiple stages of the ring oscillator 205. For example, an increase in the voltage may increase the oscillator speed of the ring oscillator 205 and therefore increase the number of stages traversed in a clock cycle. For another example, an increase in the temperature of the PSM 200 may increase the oscillator speed of the ring oscillator 205. The multiple stages of the ring oscillator 205 are arranged in a ring and so the counter 210 may also count a number of revolutions of the ring oscillator 205 during the measurement period. The number of revolutions increases when the voltage increases and decreases during voltage droops. Some embodiments of the ring oscillator 205 or the counter 210 may be reset on a leading edge of a clock cycle provided by the clock signal 215. Capture logic 220 can capture the state of the ring oscillator at the end of the measurement period.

The number of stage transitions or ring oscillator revolutions may be indicative of the operating frequency of the PSM 200 and/or an associated circuit block such as the circuit blocks 111-119 shown in FIG. 1. Information indicating the number of stage transitions or ring oscillator revolutions counted by the counter 210 (and consequently the operating frequency measured by the counter 210) during the selected measurement period can be provided to a PSM encoder 225 that supplies a PSM output signal based on the state of the ring oscillator 205 and the number of ring oscillator revolutions at the end of the measurement period. For example, the PSM output signal may be a digital value that indicates a count that is equal to the number of ring oscillator revolutions at the end of the measurement period. Some embodiments of the PSM encoder 225 may include averaging circuits to average the counts over a longer time period than the selected measurement period. The PSM output signal may then represent an average value of the counts over the longer time period.

Some embodiments of the PSM 200 may provide the PSM output signal to a system management unit (SMU) 230 (such as the system management unit 110 shown in FIG. 1) over an interface 235. For example, the power supply monitor 200 may provide a digital value that indicates a count that is equal to a number of stage transitions of the ring oscillator 205, which is indicative of the operating frequency of a circuit associated with the PSM 200, via the interface 235. In some embodiments, the system management unit 230 may periodically poll the PSM 200 to receive the PSM output signal. For example, the system management unit 230 may periodically poll the PSM 200 using a polling interval that may lie in the range from 200 µs to 2 ms, which may correspond to a thermal timescale in the PSM 200. The PSM 200 may supply an output signal over the interface 235 indicating a count or an average value of counts over a time period in response to being polled by the system management unit 230.

Referring back to FIG. 1, the system management unit 110 may also choose the voltage margins that are used to set the voltage supplied to the circuit blocks 111-119. Some embodiments of the system management unit 110 may determine the supply voltage based on a target PSM count (that corresponds to a target operating frequency) and a model of the PSM counts from the circuit blocks 111-119 as a function of temperature and voltage. For example, the system management unit 110 may calibrate the temperature-voltage model using measurements of PSM counts generated by the PSMs in each circuit block 111-119 at different combinations of the supplied voltage and temperature. The measured PSM counts and the corresponding voltages for each PSM may then be stored for later use. For example, the processing device 100 includes a set of PSM fuses 120 that can be used to store the calibration information. However, persons of ordinary skill in the art having benefit of the present disclosure should appreciate that other types of storage elements such as registers may be used to store the calibration information in some embodiments.

The system management unit 100 may also be able to reduce voltage supplied to one or more of the circuit blocks 111-119 from the initial value when the counts generated by one or more of the PSMs at the initial voltage are higher than the target PSM count. Reducing the initial voltage reduces the power consumed by the circuit blocks 111-119 without causing the operating frequency of the processing device to fall below the characteristic operating frequency associated with the target PSM count. Furthermore, the characteristic operating frequency of the processing device is not dynamically adjusted and synchronization to resources outside of the processing device 100 is therefore unaffected by the voltage adjustments.

Figure 3:
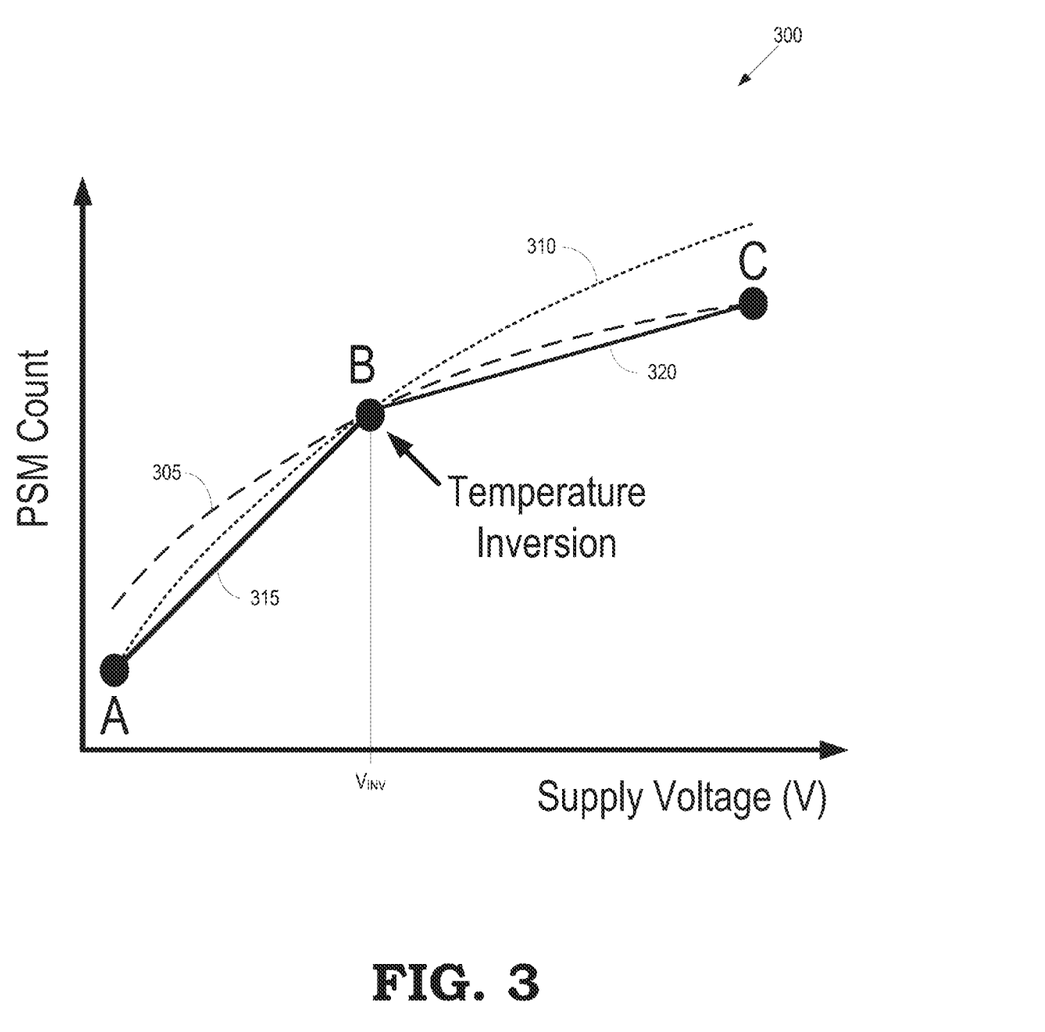
FIG. 3 is a plot of PSM counts as a function of the voltage supplied to a PSM in a processing device in accordance with some embodiments.

FIG. 3 is a plot of PSM counts as a function of the voltage supplied to a PSM in a processing device in accordance with some embodiments. The horizontal axis indicates the supply voltage in volts and the vertical axis indicates the PSM count in arbitrary units. The curve 305 shows the PSM count as a function of the supplied voltage for a relatively high temperature such as 95° C. The high temperature may correspond to a maximum operating temperature of a circuit block associated with the PSM. The curve 310 shows the PSM count as a function of the supply voltage for a relatively low temperature such as 75° C. The low temperature may correspond to a minimum operating temperature of the circuit block associated with the PSM. The curves 305, 310 cross at a temperature inversion point that corresponds to a temperature inversion voltage, $V_{INV}$. At voltages below the temperature inversion voltage, the PSM count (and corresponding operating frequency) increases with increasing temperature at a fixed voltage. At voltages above the temperature inversion voltage, the PSM count (and corresponding operating frequency) decreases with increasing temperature at a fixed voltage.

The plot 300 may be used to define voltage margins that are used to choose a supply voltage that ensures that the operating frequency of the processing device does not fall below a characteristic operating frequency within a selected range of operating parameters. In some embodiments, the voltage margins can be set using a model that includes a first linear interpolation 315 between points A and B to represent the low-voltage regime below the temperature inversion voltage and a second linear interpolation 320 between points B and C to represent the high-voltage regime above the temperature inversion voltage. For a given characteristic operating frequency, setting the operating voltage at a value determined by the model 315, 320 ensures that the operating frequency of the processing device does not fall below the characteristic operating frequency within the range of temperatures represented by the curves 305, 310. Additional factors may be used to set the voltage margin in some embodiments. Persons of ordinary skill in the art having benefit of the present disclosure should also appreciate that more or fewer points, as well as different interpolation schemes, may be used to generate the model in some embodiments.

Figure 4:
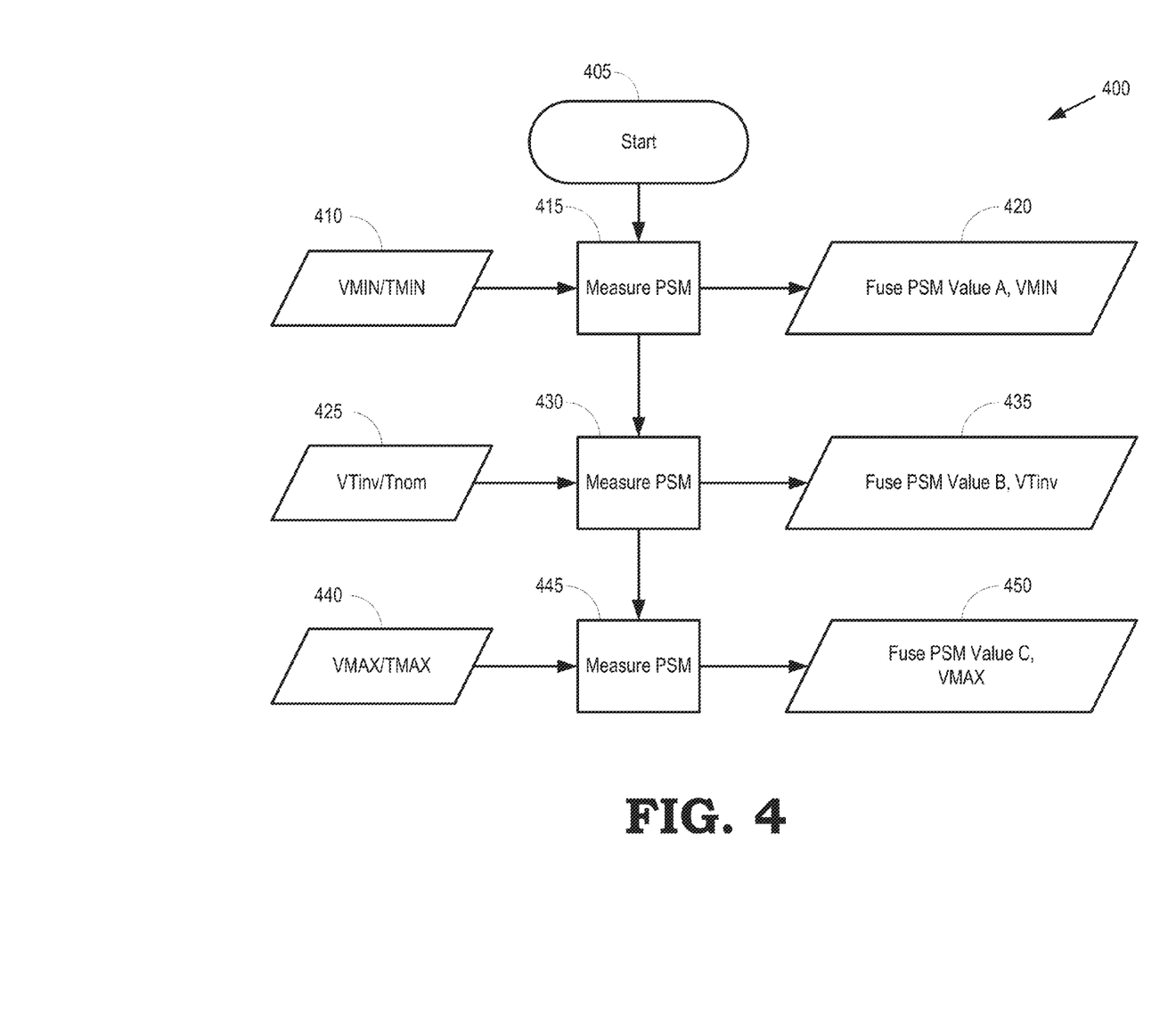
FIG. 4 is a flow diagram of a method for calibrating model parameters used to generate a model of PSM counts (or a corresponding operating frequency) as a function of voltage and temperature in accordance with some embodiments.

FIG. 4 is a flow diagram of a method 400 for calibrating model parameters used to generate a model of PSM counts (or a corresponding operating frequency) as a function of voltage and temperature in accordance with some embodiments. The method 400 may be implemented in the system management unit 110 shown in FIG. 1. The method 400 starts at 405. A PSM is supplied with a low voltage (VMIN) while operating at a selected low temperature (TMIN), as indicated by the inputs 410. The voltage VMIN is selected to be below a temperature inversion voltage for the PSM. For example, the voltage VMIN and the temperature TMIN may correspond to the voltage and temperature at point A shown in FIG. 3. At block 415, the system management unit measures a count or an average of counts generated by the PSM. At block 420, the measured count or count average is then stored, e.g., by fusing the measured value into fuses such as the PSM fuses 120 shown in FIG. 1. The PSM is also supplied with a voltage that is approximately equal to the temperature inversion voltage (VTinv) while operating at a nominal temperature (Tnom), as indicated by the inputs 425. For example, the voltage VTinv and the temperature Tnom may correspond to the voltage and temperature at point B shown in FIG. 3. At block 430, the system management unit measures a count or an average of counts generated by the PSM. At block 435, the measured count or count average is stored, e.g., by fusing the measured value into fuses such as the PSM fuses 120 shown in FIG. 1. The PSM is also supplied with a high voltage (VMAX) while operating at a selected high temperature (TMAX), as indicated by the inputs 440. The voltage VMAX is selected to be above the temperature inversion voltage for the PSM. For example, the voltage VMAX and the temperature TMAX may correspond to the voltage and temperature at point C shown in FIG. 3. At block 445, the system management unit measures a count or an average of counts generated by the PSM. At block 450, the measured count or count average is then stored, e.g., by fusing the measured value into fuses such as the PSM fuses 120 shown in FIG. 1.

Figure 5:
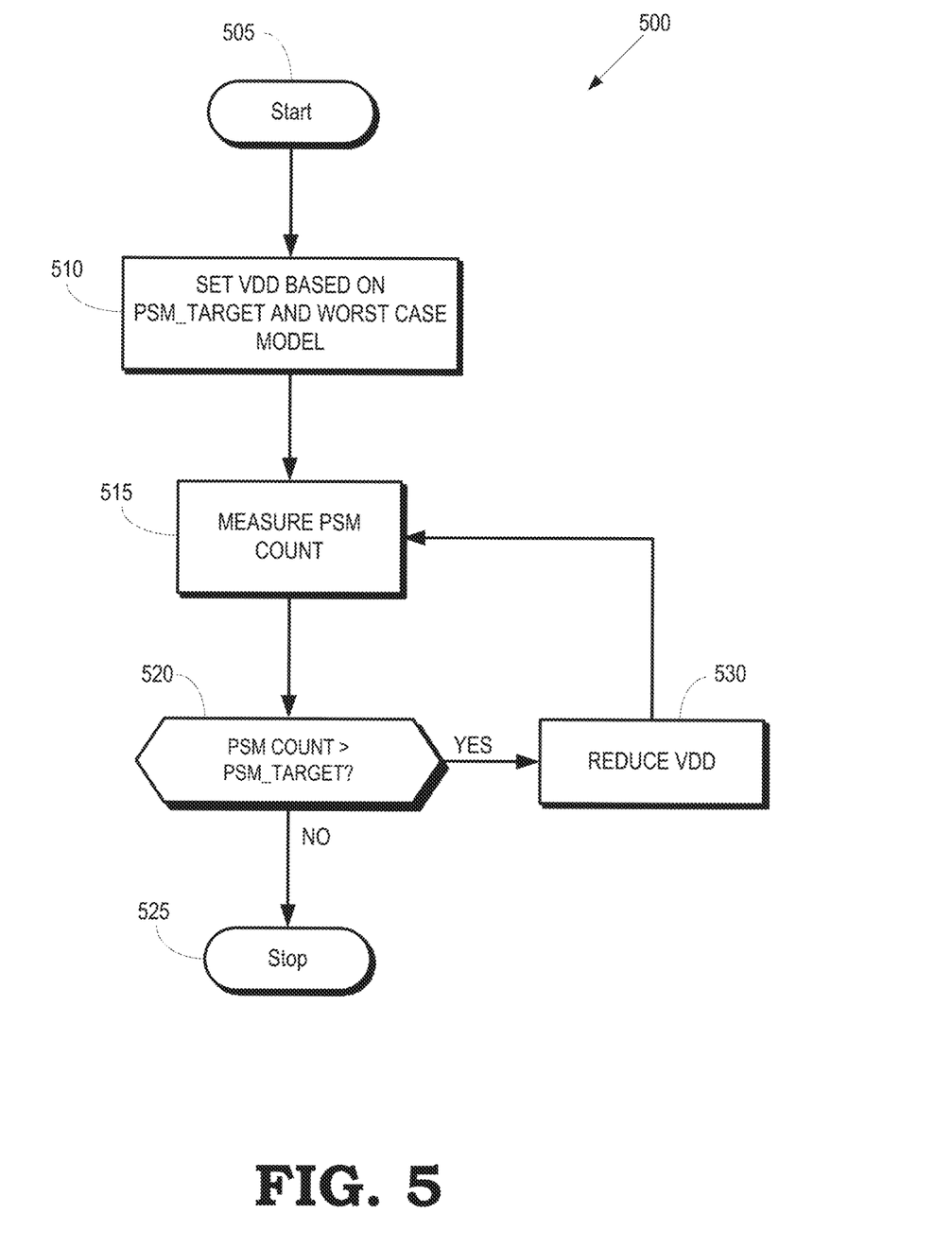
FIG. 5 is a flow diagram of a method of adaptive voltage scaling that reduces voltage margins based on counts generated by one or more PSMs in accordance with some embodiments.

FIG. 5 is a flow diagram of a method 500 of adaptive voltage scaling that reduces voltage margins based on counts generated by one or more PSMs in accordance with some embodiments. The method 500 may be implemented in the system management unit 110 shown in FIG. 1. The method 500 starts at 505. At block 510, the system management unit selects an operating voltage (VDD) that is supplied to a corresponding processing device including one or more PSMs. The operating voltage is selected based on a target PSM count that corresponds to a target operating frequency for the processing device. Voltage margins are determined by a worst-case model such as the interpolated model 315, 320 shown in FIG. 3 and so the operating voltage is set equal to the worst-case model voltage corresponding to the target PSM count.

At block 515, PSM counts or average counts may be measured and provided to the system management unit over an interface such as the interface 235 shown in FIG. 2. If the measured PSM count is less than or equal to the target PSM count at decision block 520, the method 500 may stop at 525. If the measured PSM count is greater than the target PSM count, indicating that the voltage margins may have been set too high by the worst-case model, the supplied voltage may be reduced at block 530. For example, the supplied voltage may be reduced by a predetermined decrement value. The system management unit may continue to monitor the measured PSM counts and iteratively reduce the supply voltage until the measured PSM count is less than or equal to the target PSM count at decision block 520. The method 500 may then end at 525.

Figure 6:
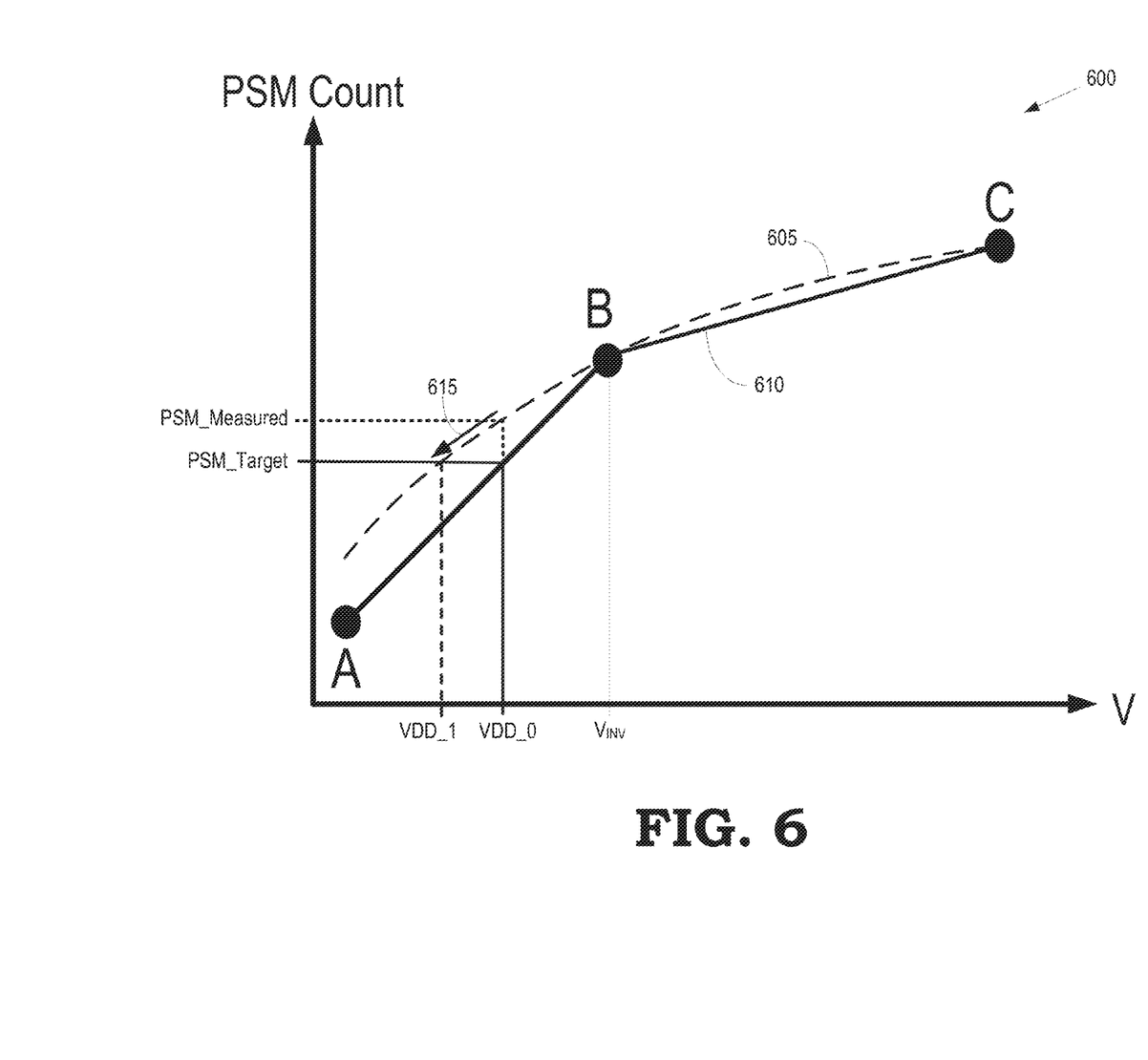
FIG. 6 is a plot of PSM counts as a function of the voltage supplied to a PSM in a processing device in accordance with some embodiments.

FIG. 6 is a plot of PSM counts as a function of the voltage supplied to a PSM in a processing device in accordance with some embodiments. The horizontal axis indicates the supply voltage in volts and the vertical axis indicates the PSM count in arbitrary units. The curve 605 shows the PSM count as a function of the supplied voltage for a relatively high temperature such as 95° C. The high temperature may correspond to a maximum operating temperature of a circuit block associated with the PSM. A system management unit such as the system management unit 110 shown in FIG. 1 initially establishes a target PSM count (PSM_Target) based on the target operating frequency of the processing device and then uses the worst-case model 610 to determine an initial operating voltage (VDD_0) to be supplied to the processing device. For example, the initial operating voltage (VDD_0) is below the temperature inversion voltage ($V_{INV}$) and so it may be determined using the interpolated curve between the points A and B.

In the plot shown in FIG. 6, the processing device is operating at a relatively high temperature. The measured PSM count (PSM_Measured) corresponds to a value on the curve 605 at the initial operating voltage (VDD_0), so the measured PSM count is higher than the target PSM count. The system management unit may therefore reduce the operating voltage to the voltage (VDD_1). Reducing the voltage causes the measured the PSM count to decrease along the curve 605 as indicated by the arrow 615 until it is substantially equal to the target PSM count at the voltage (VDD_1). The operating voltage may therefore be reduced to eliminate the excess voltage margin without causing the operating frequency of the processing device to fall below its target operating frequency. The voltage may be reduced in a single step or may be reduced iteratively in successive smaller steps.

Figure 7:
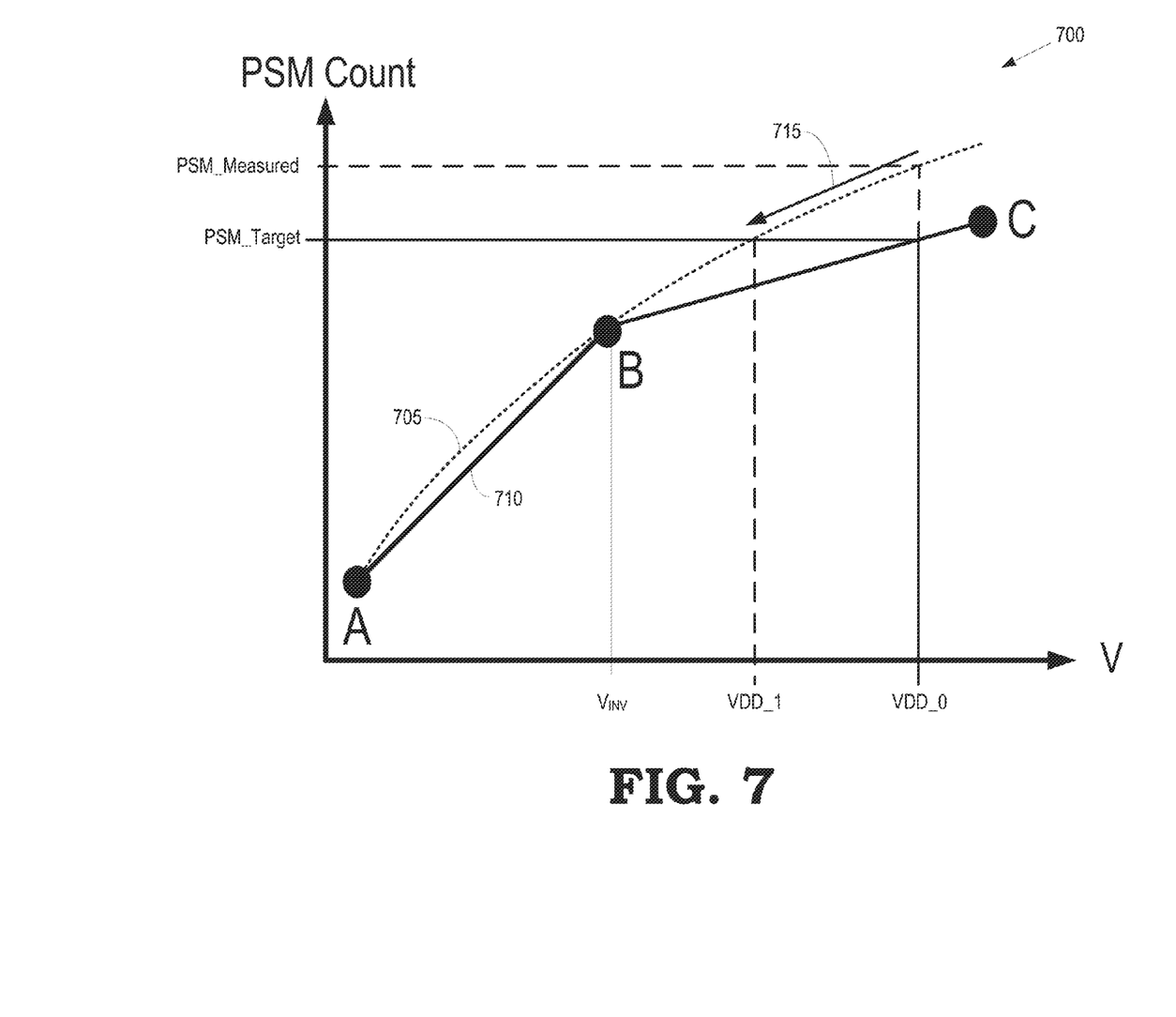
FIG. 7 is a plot of PSM counts as a function of the voltage supplied to a PSM in a processing device in accordance with some embodiments.

FIG. 7 is a plot of PSM counts as a function of the voltage supplied to a PSM in a processing device in accordance with some embodiments. The horizontal axis indicates the supply voltage in volts and the vertical axis indicates the PSM count in arbitrary units. The curve 705 shows the PSM count as a function of the supplied voltage for a relatively low temperature such as 75° C. The low temperature may correspond to a minimum operating temperature of a circuit block associated with the PSM. A system management unit such as the system management unit 110 shown in FIG. 1 initially establishes a target PSM count (PSM_Target) based on the target operating frequency of the processing device and then uses the worst-case model 710 to determine an initial operating voltage (VDD_0) to be supplied to the processing device. For example, the initial operating voltage (VDD_0) is above the temperature inversion voltage ($V_{INV}$) and so it may be determined using the interpolated curve between the points B and C.

In the plot shown in FIG. 7, the processing device is operating at a relatively low temperature. The measured PSM count (PSM_Measured) corresponds to a value on the curve 705 at the initial operating voltage (VDD_0), so the measured PSM count is higher than the target PSM count. The system management unit may therefore reduce the operating voltage to the voltage (VDD_1). Reducing the voltage causes the measured the PSM count to decrease along the curve 705 as indicated by the arrow 715 until it is substantially equal to the target PSM count at the voltage (VDD_1). The operating voltage may therefore be reduced to eliminate the excess voltage margin without causing the operating frequency of the processing device to fall below its target operating frequency. The voltage may be reduced in a single step or may be reduced iteratively in successive smaller steps.

Figure 8:
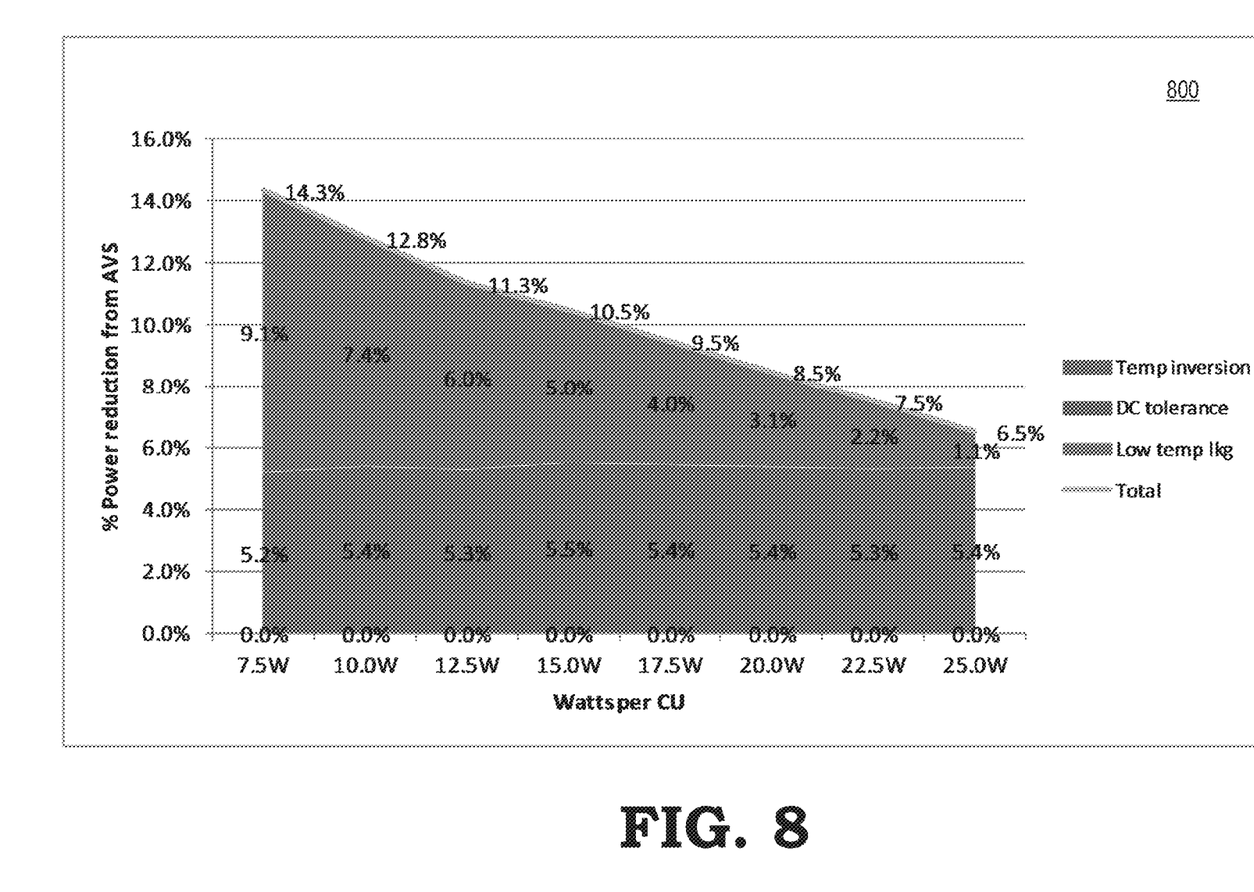
FIG. 8 is a plot of the power reduction that results from adaptive voltage scaling in accordance with some embodiments.

FIG. 8 is a plot 800 of the power reduction created by adaptive voltage scaling in accordance with some embodiments. The horizontal axis shows the watts consumed by a compute unit (CU) such as a processor core in a processing device and the vertical axis shows the percentage of power reduction produced by adaptive voltage scaling, e.g., according to the method 500 shown in FIG. 5. The processing device is operating at a temperature of 95° C. in the embodiment shown in FIG. 8. The relatively high temperature leads to a relatively large leakage current because leakage currents increase with increasing temperature. However, adaptive voltage scaling can exploit the temperature inversion to reduce the operating voltage while maintaining the operating frequency of the compute unit above its characteristic operating frequency, as discussed herein. The total power savings increases from 6.5% at 25.0 watts to 14.3% at 7.5 watts.

Figure 9:
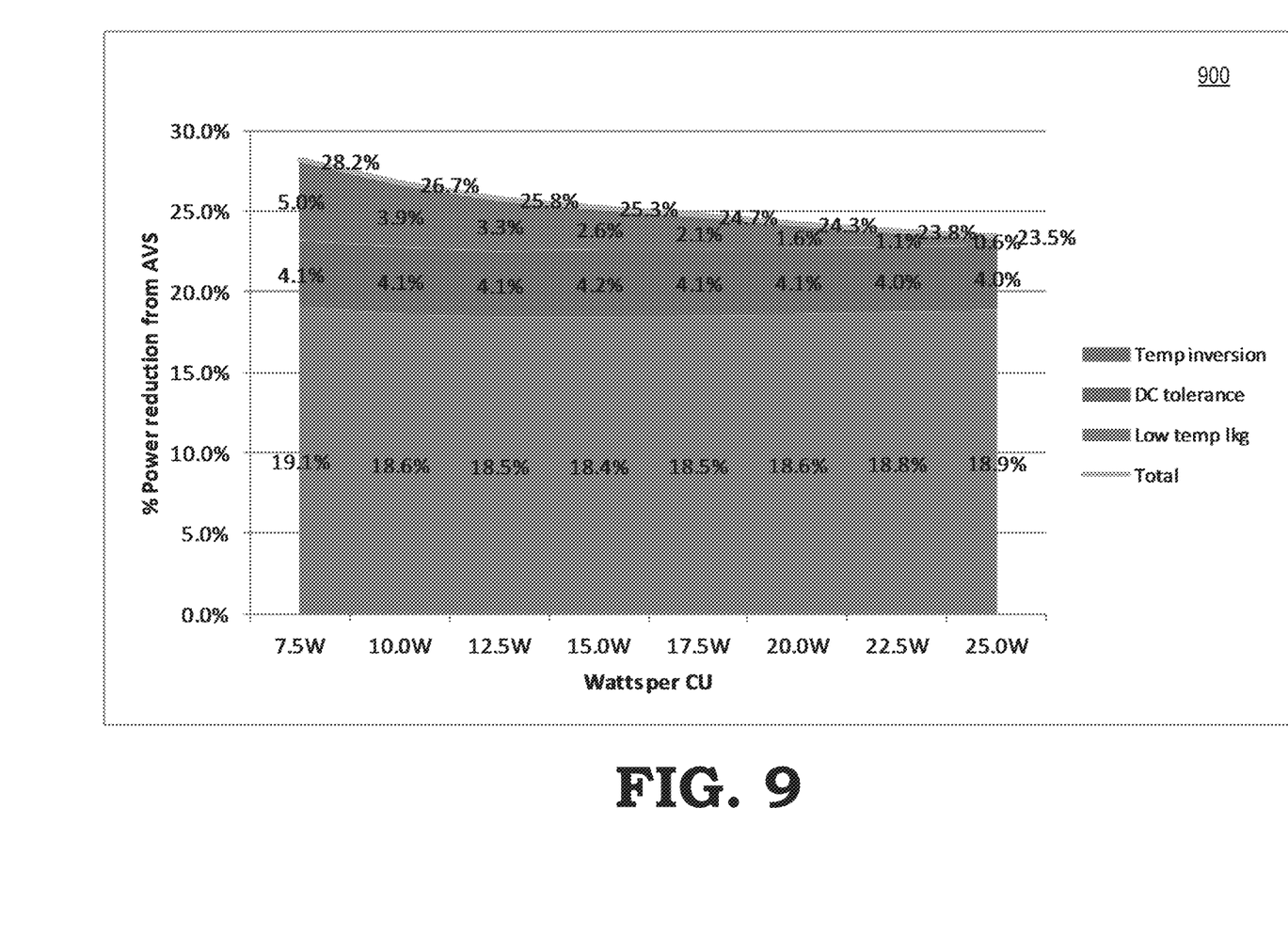
FIG. 9 is a plot of the power reduction that results from adaptive voltage scaling in accordance with some embodiments.

FIG. 9 is a plot 900 of the power reduction created by adaptive voltage scaling in accordance with some embodiments. The horizontal axis shows the watts consumed by a compute unit (CU) in a processing device and the vertical axis shows the percentage of power reduction produced by adaptive voltage scaling, e.g., according to the method 500 shown in FIG. 5. The processing device is operating at a temperature of 75° C. in the embodiment shown in FIG. 9. The adaptive voltage scaling can exploit the temperature inversion to reduce the operating voltage while maintaining the operating frequency of the compute unit above its characteristic operating frequency, as discussed herein. The gains from exploiting the temperature inversion are smaller at the lower temperature but they are partially offset by the reduction in the leakage current at the lower temperature. The total power savings increases from 23.5% at 25.0 watts to 28.2% at 7.5 watts.

In some embodiments, the apparatus and techniques described above are implemented in a system comprising one or more integrated circuit (IC) devices (also referred to as integrated circuit packages or microchips), such as the processing device described above with reference to FIGS. 1-9. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 10:
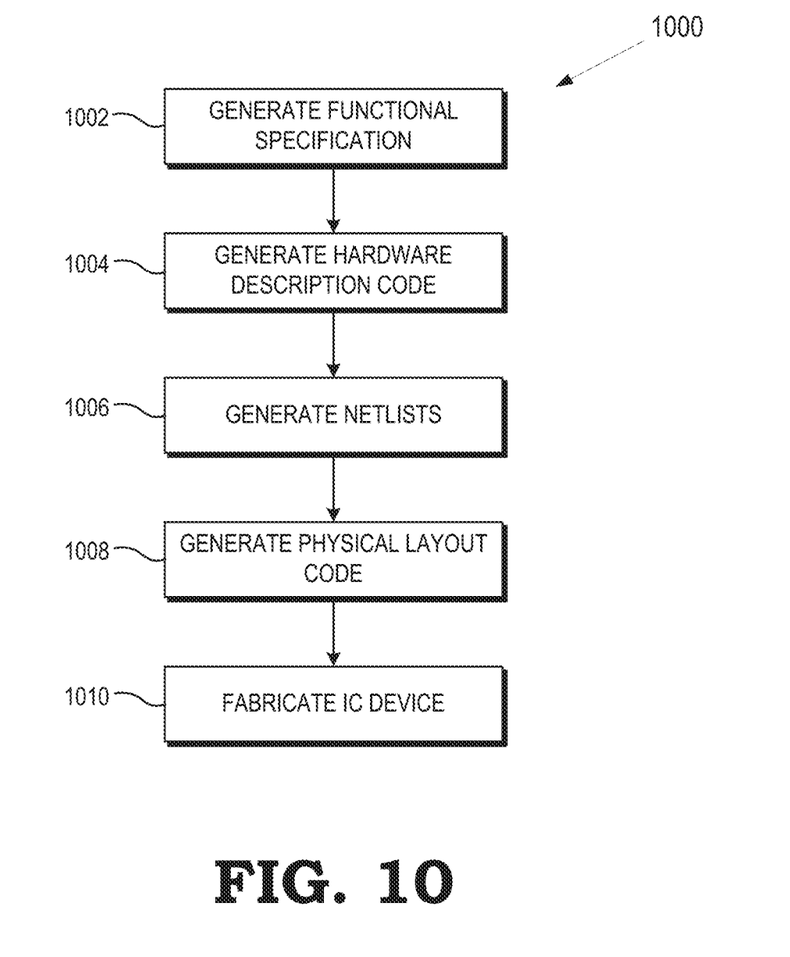
FIG. 10 is a flow diagram illustrating a method for designing and fabricating an integrated circuit device implementing at least a portion of a component of a processing system in accordance with some embodiments.

FIG. 10 is a flow diagram illustrating an example method 500 for the design and fabrication of an IC device implementing one or more aspects in accordance with some embodiments. As noted above, the code generated for each of the following processes is stored or otherwise embodied in non-transitory computer readable storage media for access and use by the corresponding design tool or fabrication tool.

At block 1002 a functional specification for the IC device is generated. The functional specification (often referred to as a micro architecture specification (MAS)) may be represented by any of a variety of programming languages or modeling languages, including C, C++, SystemC, Simulink, or MATLAB.

At block 1004, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 1006 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 1008, one or more EDA tools use the netlists produced at block 1006 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 1010, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A processing device, comprising:
   at least one power supply monitor to provide at least one count representative of at least one operating frequency of at least one circuit block based on a voltage supplied to said at least one circuit block; and
   a system management unit to determine an initial voltage supplied to said at least one circuit block based on a target count and to reduce the voltage supplied to said at least one circuit block from the initial voltage in response to said at least one count generated by said at least one power supply monitor exceeding the target count, wherein the system management unit is to determine the initial voltage based on the target count and a model of said at least one operating frequency of said at least one circuit block as a function of temperature and voltage, and wherein the system management unit is to generate the model by interpolating between at least one first count generated at a first temperature and a first voltage, at least one second count generated at a second temperature and a second voltage, and at least one third count generated at a third temperature and a third voltage, wherein the first temperature is lower than the second temperature and the second temperature is lower than the third temperature, and wherein the first voltage is lower than the second voltage and the second voltage is lower than the third voltage.

2. The processing device of claim 1, comprising an interface between each power supply monitor and the system management unit, wherein each power supply monitor provides an average of its counts over a predetermined time interval to the system management unit over the interface, and wherein the voltage supplied to said at least one circuit block is reduced from the initial voltage in response to the average of the counts exceeding the target count.

3. The processing device of claim 1, wherein the second voltage is a temperature inversion voltage of the processing device such that the operating frequency of the processing device increases with increasing temperature at a fixed voltage below the temperature inversion voltage and the operating frequency of the processing device decreases with increasing temperature at a fixed voltage above the temperature inversion voltage.

4. The processing device of claim 1, further comprising a plurality of fuses to store information indicating said at least one first count and the first voltage, said at least one second count and the second voltage, and said at least one third count and the third voltage.

5. The processing device of claim 1, wherein the system management unit iteratively reduces the voltage supplied to said at least one circuit block by a predetermined voltage decrement until said at least one count generated by said at least one power supply monitor is less than or equal to the target count.

6. A method, comprising:
   generating, using at least one power supply monitor, at least one count representative of at least one operating frequency of at least one circuit block based on a voltage supplied to said at least one circuit block;
   generating a model of said at least one operating frequency of said at least one circuit block as a function of temperature and voltage by interpolating between measured values of said at least one count provided by said at least one power supply monitor at a plurality of predetermined values of temperature and voltage;
   determining, at a system management unit, an initial voltage supplied to said at least one circuit block based on a target count and the model; and
   reducing, at the system management unit, the voltage supplied to said at least one circuit block from the initial voltage in response to said at least one count generated by said at least one power supply monitor exceeding the target count, wherein generating the model comprises generating the model by interpolating between at least one first count generated at a first temperature and a first voltage, at least one second count generated at a second temperature and a second voltage, and at least one third count generated at a third temperature and a third voltage, wherein the first temperature is lower than the second temperature is lower than the third temperature, and wherein the first voltage is lower than the second voltage is lower than the third voltage.

7. The method of claim 6, further comprising:
   averaging counts determined by said at least one power supply monitor over a predetermined time interval;
   providing information indicating the average over an interface between each power supply monitor and the system management unit; and
   reducing the voltage supplied to said at least one circuit block from the initial voltage in response to the average of the counts exceeding the target count.

8. The method of claim 6, wherein the second voltage is a temperature inversion voltage such that the at least one operating frequency of the at least one circuit block increases with increasing temperature at a fixed voltage below the temperature inversion voltage and the at least one operating frequency of the at least one circuit block decreases with increasing temperature at a fixed voltage above the temperature inversion voltage.

9. The method of claim 6, comprising storing information indicating said at least one first count and the first voltage, said at least one second count and the second voltage, and said at least one third count and the third voltage in a plurality of fuses.

10. The method of claim 6, wherein reducing the voltage comprises reducing iteratively reduces the voltage supplied to said at least one circuit block by a predetermined voltage decrement until said at least one count generated by said at least one power supply monitor is less than or equal to the target count.

11. A non-transitory computer readable medium embodying a set of executable instructions, the set of executable instructions to manipulate a computer system to perform a portion of a process to fabricate at least part of a processor, the processor comprising:
- at least one power supply monitor to provide at least one count, wherein each power supply monitor comprises a ring oscillator and a counter to generate a count equal to a number of stage transitions or ring oscillator revolutions during a measurement period, the number representing at least one operating frequency of at least one circuit block produced in response to a voltage supplied to said at least one circuit block; and
- a system management unit to determine an initial voltage supplied to said at least one circuit block based on a target count and to reduce the voltage supplied to said at least one circuit block from the initial voltage in response to said at least one count generated by said at least one power supply monitor exceeding the target count, wherein the system management unit is to determine the initial voltage based on the target count and a model of said at least one operating frequency of said at least one circuit block as a function of temperature and voltage, and wherein the system management unit is to generate the model by interpolating between at least one first count generated at a first temperature and a first voltage, at least one second count generated at a second temperature and a second voltage, and at least one third count generated at a third temperature and a third voltage, wherein the first temperature is lower than the second temperature and the second temperature is lower than the third temperature, and wherein the first voltage is lower than the second voltage and the second voltage is lower than the third voltage.

12. The non-transitory computer readable medium of claim 11, comprising executable instructions to manipulate a computer system to perform a portion of a process to fabricate at least part of a processor, the processor comprising:
- an interface between each power supply monitor and the system management unit, wherein each power supply monitor provides an average of its counts over a predetermined time interval to the system management unit over the interface, and wherein the voltage supplied to said at least one circuit block is reduced from the initial voltage in response to the average of the counts exceeding the target count.

* * * * *